US012602762B2

(12) United States Patent
Norton, Jr. et al.

(10) Patent No.: US 12,602,762 B2
(45) Date of Patent: Apr. 14, 2026

(54) HEAT-BASED AUTHENTICATION

(71) Applicant: Lenovo (Singapore) Pte. Ltd., New Tech Park (SG)

(72) Inventors: Robert James Norton, Jr., Raleigh, NC (US); Robert J. Kapinos, Durham, NC (US); Russell S. VanBlon, Raleigh, NC (US); Scott Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 293 days.

(21) Appl. No.: 18/447,898

(22) Filed: Aug. 10, 2023

(65) Prior Publication Data

US 2025/0054126 A1     Feb. 13, 2025

(51) Int. Cl.
*G06T 7/00*          (2017.01)

(52) U.S. Cl.
CPC .. *G06T 7/0004* (2013.01); *G06T 2207/30224* (2013.01)

(58) Field of Classification Search
CPC ......... G06T 7/0004; G06T 2207/30224; G06T 2207/10048

USPC .................................................. 382/100, 103
See application file for complete search history.

(56) References Cited

U.S. PATENT DOCUMENTS

| | | | | |
|---|---|---|---|---|
| 2002/0172410 A1* | 11/2002 | Shepard | .................... | G06T 7/40 |
| | | | | 382/141 |
| 2011/0299826 A1* | 12/2011 | Weisbach | ............. | H04N 25/673 |
| | | | | 348/E5.09 |
| 2013/0320087 A1* | 12/2013 | Moran | .................... | G06K 19/18 |
| | | | | 235/440 |
| 2015/0324618 A1* | 11/2015 | Malcolm | ................ | G06K 19/18 |
| | | | | 235/440 |
| 2021/0096065 A1* | 4/2021 | Nalladega | .......... | G01N 21/3563 |

* cited by examiner

*Primary Examiner* — Sheela C Chawan
(74) *Attorney, Agent, or Firm* — Kunzler Needham & Hilton

(57)          ABSTRACT

Apparatuses, methods, and systems are disclosed for heat-based authentication. An apparatus includes a processor and a memory that stores code that is executable by the processor. The code is executable by the processor to capture a thermal image of an object placed within a heated environment, identify at least one characteristic of the object based on the thermal image, and determine an authenticity of the object based on the at least one characteristic.

20 Claims, 6 Drawing Sheets

200

Authentication Apparatus
104

Imaging Module
202

Characteristic
Determination
Module
204

Authentication
Determination
Module
206

302

304

306b ✓ *Official*

306a ✓ *1 of 100*

302

400

Start

402  Capture A Thermal Image Of An Object Placed Within A Heated Environment

404  Identify At Least One Characteristic Of The Object Based On The Thermal Image 406  Determine An Authenticity Of The Object Based On The At Least One Characteristic End

500

600

HEAT-BASED AUTHENTICATION

FIELD

The subject matter disclosed herein relates to authenticating objects and more particularly relates to authenticating objects using heat signatures.

BACKGROUND

Thermal imaging can be used to capture and create an image of an object based on infrared radiation that is emitted from the object. The resulting image may depict characteristics of the object that are not visible to the naked eye or in an image captured using a normal camera.

BRIEF SUMMARY

An apparatus for heat-based authentication is disclosed. A method and system also perform the functions of the apparatus. In one embodiment, an apparatus includes a processor and a memory that stores code that is executable by the processor. In one embodiment, the code is executable by the processor to capture a thermal image of an object placed within a heated environment, identify at least one characteristic of the object based on the thermal image, and determine an authenticity of the object based on the at least one characteristic.

In one embodiment, a system for heat-based authentication includes a heated environment, a thermal camera, a processor, and a memory that stores code that is executable by the processor. In one embodiment, the code is executable by the processor to capture a thermal image of an object placed within a heated environment, identify at least one characteristic of the object based on the thermal image, and determine an authenticity of the object based on the at least one characteristic.

In one embodiment, a method for heat-based authentication includes capturing, by a processor, a thermal image of an object placed within a heated environment, identifying at least one characteristic of the object based on the thermal image, and determining an authenticity of the object based on the at least one characteristic.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
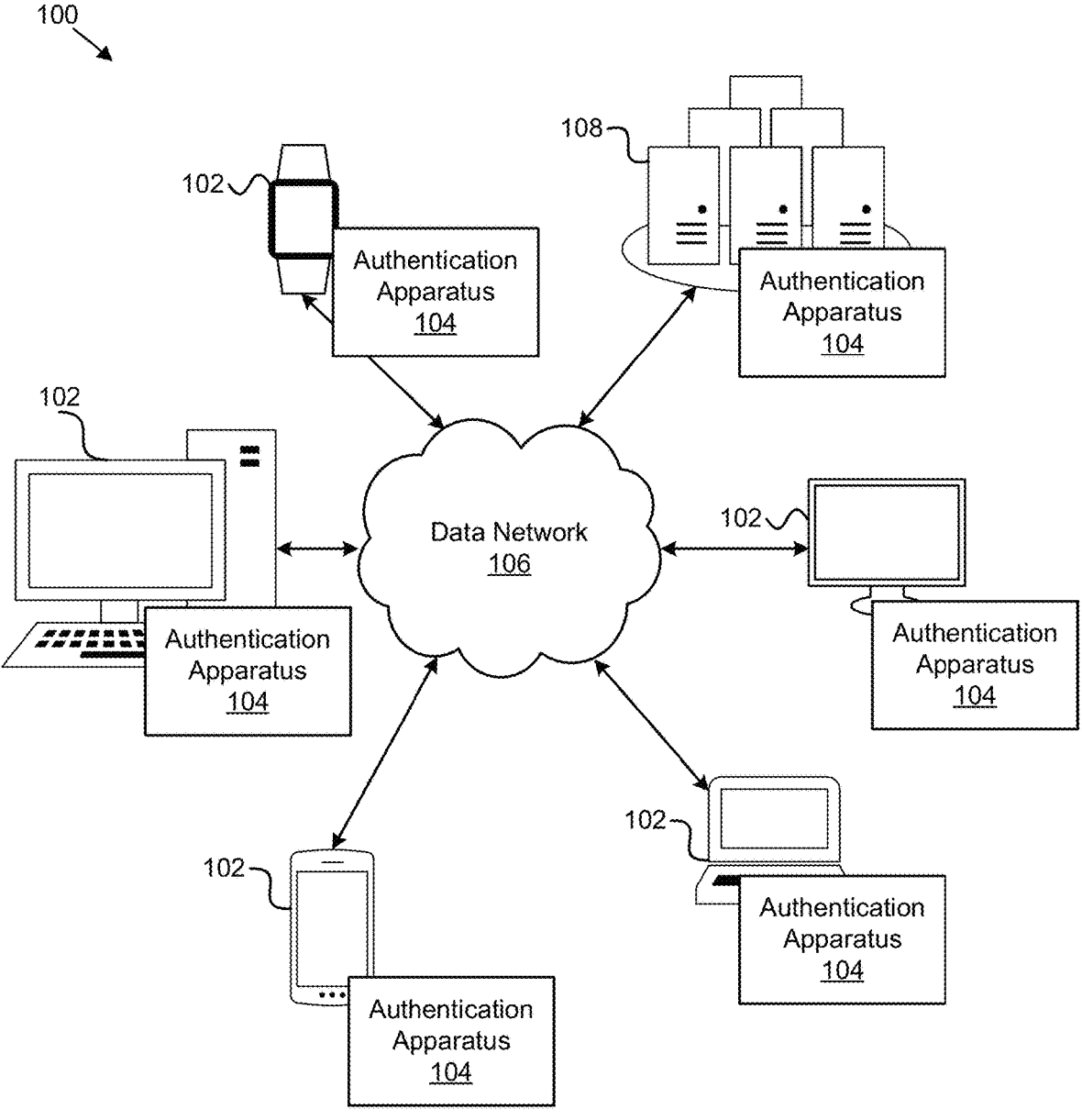
FIG. 1 is a schematic block diagram illustrating one embodiment of a system for heat-based authentication in accordance with the subject matter disclosed herein.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

In one embodiment, an apparatus includes a processor and a memory that stores code that is executable by the processor. In one embodiment, the code is executable by the processor to capture a thermal image of an object placed within a heated environment, identify at least one characteristic of the object based on the thermal image, and determine an authenticity of the object based on the at least one characteristic.

In one embodiment, the code is executable by the processor to identify the at least one characteristic based on a thermal signature of the object. In one embodiment, the at least one characteristic comprises a pattern, a predefined indicator, or a combination of both within the thermal signature of the object.

In one embodiment, the pattern comprises manufacturing indicia that are introduced to the object during manufacturing. In one embodiment, the manufacturing indicia comprises void patterns, ridge patterns, bubble patterns, or a combination thereof that are indicative of manufacturing equipment, a manufacturing location, or a combination thereof.

In one embodiment, the predefined indicator comprises a heat sensitive material that is present within the object and is known prior to capturing the thermal image. In one embodiment, the heat sensitive material comprises a metal wire that is placed within the object in a predefined pattern.

In one embodiment, the code is executable by the processor to compare the thermal signature of the object to a second thermal signature of the object to determine the authenticity of the object. In one embodiment, the second thermal signature comprises a previously-determined thermal signature of the object, the previously-determined thermal signature associated with the object in a way that uniquely identifies the object.

In one embodiment, the previously-determined thermal signature is associated with the object using a secure database, a blockchain, or a combination thereof. In one embodiment, the object comprises a security card that includes heat sensitive material placed within the security card in a predefined pattern. In one embodiment, the object comprises a collectable item. In one embodiment, the apparatus further comprises an infrared camera for capturing the thermal image of the object.

In one embodiment, a system for heat-based authentication includes a heated environment, a thermal camera, a processor, and a memory that stores code that is executable by the processor. In one embodiment, the code is executable by the processor to capture a thermal image of an object placed within a heated environment, identify at least one characteristic of the object based on the thermal image, and determine an authenticity of the object based on the at least one characteristic.

In one embodiment, the heated environment is configured to raise the temperature of the object to a temperature within a predefined temperature range. In one embodiment, the thermal camera comprises an infrared camera.

In one embodiment, the code is executable by the processor to identify the at least one characteristic based on a thermal signature of the object. In one embodiment, the at least one characteristic comprises a pattern, a predefined indicator, or a combination of both within the thermal signature of the object.

In one embodiment, the pattern comprises manufacturing indicia that are introduced to the object during manufacturing. In one embodiment, the manufacturing indicia comprises void patterns, ridge patterns, bubble patterns, or a combination thereof that are indicative of manufacturing equipment, a manufacturing location, or a combination thereof.

In one embodiment, the predefined indicator comprises a heat sensitive material that is present within the object and is known prior to capturing the thermal image. In one embodiment, the heat sensitive material comprises a metal wire that is placed within the object in a predefined pattern.

In one embodiment, the code is executable by the processor to compare the thermal signature of the object to a second thermal signature of the object to determine the authenticity of the object. In one embodiment, the second thermal signature comprises a previously-determined thermal signature of the object, the previously-determined thermal signature associated with the object in a way that uniquely identifies the object.

In one embodiment, the previously-determined thermal signature is associated with the object using a secure database, a blockchain, or a combination thereof. In one embodiment, the object comprises a security card that includes heat sensitive material placed within the security card in a predefined pattern. In one embodiment, the object comprises a collectable item.

In one embodiment, a method for heat-based authentication includes capturing, by a processor, a thermal image of an object placed within a heated environment, identifying at least one characteristic of the object based on the thermal image, and determining an authenticity of the object based on the at least one characteristic.

In one embodiment, the method includes identifying the at least one characteristic based on a thermal signature of the object. In one embodiment, the at least one characteristic comprises a pattern, a predefined indicator, or a combination of both within the thermal signature of the object.

In one embodiment, the pattern comprises manufacturing indicia that are introduced to the object during manufacturing. In one embodiment, the manufacturing indicia comprises void patterns, ridge patterns, bubble patterns, or a combination thereof that are indicative of manufacturing equipment, a manufacturing location, or a combination thereof.

In one embodiment, the predefined indicator comprises a heat sensitive material that is present within the object and is known prior to capturing the thermal image. In one embodiment, the heat sensitive material comprises a metal wire that is placed within the object in a predefined pattern.

In one embodiment, the method includes comparing the thermal signature of the object to a second thermal signature of the object to determine the authenticity of the object. In one embodiment, the second thermal signature comprises a previously-determined thermal signature of the object, the previously-determined thermal signature associated with the object in a way that uniquely identifies the object.

In one embodiment, the previously-determined thermal signature is associated with the object using a secure database, a blockchain, or a combination thereof. In one embodiment, the object comprises a security card that includes heat sensitive material placed within the security card in a predefined pattern. In one embodiment, the object comprises a collectable item.

FIG. 1 is a schematic block diagram illustrating one embodiment of a system 100 for heat-based authentication. In one embodiment, the system 100 includes one or more information handling devices 102, one or more authentication apparatuses 104, one or more data networks 106, and one or more servers 108. In certain embodiments, even though a specific number of information handling devices 102, authentication apparatuses 104, data networks 106, and servers 108 are depicted in FIG. 1, one of skill in the art will recognize, in light of this disclosure, that any number of information handling devices 102, authentication apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In general, in one embodiment, the authentication apparatus 104 is configured to use a heat signature of an object to determine whether the object is authentic or a counterfeit. As used herein, the term authentic may refer to an object that is of an undisputed origin or is genuine. As described in more detail below, the authentication apparatus 104 captures a thermal image of an object placed within a heated environment, identifies at least one characteristic of the object based on the thermal image, and determines an authenticity of the object based on the at least one characteristic.

In this manner, the authentication apparatus 104 can determine whether an object such as an identification card, sports memorabilia, or the like, is authentic or genuine and not a counterfeit based on the heat signature properties and/or other heat signature characteristics of the object as captured using a thermal imaging device. The authentication apparatus 104 is described in more detail below with reference to FIG. 2.

In certain embodiments, the authentication apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the authentication apparatus 104 may include a power interface, a wired and/or wireless network interface, a graphical interface that attaches to a display, and/or a semiconductor integrated circuit device as described below, configured to perform the functions described herein with regard to the authentication apparatus 104.

The authentication apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the authentication apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the authentication apparatus 104.

The semiconductor integrated circuit device or other hardware appliance of the authentication apparatus 104, in certain embodiments, includes and/or is communicatively coupled to one or more volatile memory media, which may include but is not limited to random access N memory ("RAM"), dynamic RAM ("DRAM"), cache, or the like. In one embodiment, the semiconductor integrated circuit device or other hardware appliance of the authentication apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to execute or run machine learning algorithms, programs, applications, processes, and/or the like; communicate with a thermal imaging device; store thermal imaging data in a database, blockchain, or other secure data structure; and/or the like.

Figure 2:
FIG. 2 is a schematic block diagram illustrating one embodiment of an apparatus for heat-based authentication in accordance with the subject matter disclosed herein.

FIG. 2 is a schematic block diagram illustrating one embodiment of an apparatus 200 for heat-based authentication. In one embodiment, the apparatus 200 includes an instance of an authentication apparatus 104. In one embodiment, the authentication apparatus 104 includes one or more of an imaging module 202, a characteristic determination module 204, and an authentication determination module 206, which are described in more detail below.

In one embodiment, the imaging module 202 is configured to capture a thermal image of an object placed within a heated environment. In certain embodiments, the imaging module 202 is communicatively coupled to a thermal imaging device, such as an infrared camera, to capture a thermal image of an object. The thermal image may be a visual representation of the spatial distribution of temperature differences in a scene viewed by the thermal camera.

In one embodiment, the heated environment may be an environment where the temperature, humidity air pressure, lighting, and/or other variables can be controlled. The heated environment may be configured to heat a space, e.g., a room, a container, and/or the like, where the object is located to a predetermined temperature so that the imaging module 202 can capture a thermal image of the object that displays different thermal characteristics. In certain embodiments, the variables or settings of the heated environment are configured to be reproducible such that an object can be placed in the heated environment and a thermal image of the object can be captured for comparison with a previously captured thermal image of the object under substantially similar conditions, as described in more detail below.

In one embodiment, the characteristic determination module 204 is configured to identify at least one characteristic of the object based on the thermal image. In certain embodiments, the characteristic determination module 204 identifies the at least one characteristic based on a thermal signature of the object. As used herein, a thermal signature, or a heat signature, of an object may refer to the visible representation of the exterior and/or interior temperature of an object, as captured by a thermal imaging device such as an infrared camera.

In one embodiment, the at least one characteristic comprises a pattern, a predefined indicator, or a combination of both within the thermal signature of the object. For instance, in one embodiment, the pattern may include manufacturing indicia that are introduced to the object during manufacturing. For example, when an object such as a motherboard, a baseball, and/or the like is manufactured using tooling or equipment from the original or genuine manufacturer, there may be various characteristics or patterns that are introduced during the manufacturing process such as void patterns, ridge patterns, bubble patterns, or a combination thereof that may uniquely identify the real manufacturer, manufacturing equipment, the manufacturing location, and/or the like.

In such an embodiment, the characteristic determination module 204 may identify these patterns within the thermal image, e.g., using image processing techniques, and may flag areas, regions, blocks, pixels, or the like of the thermal image as areas containing or showing these characteristics, which may be selected for further analysis, comparison, and/or the like.

In one embodiment, the characteristic determination module 204 identifies a predefined indicator within the object, which may include a heat sensitive material that is present within the object and is known prior to capturing the thermal image. For instance, the heat sensitive material may include a metal wire that is placed within the object in a predefined pattern.

For example, a Nike® shoe may have a metal wire placed underneath the border of the "swoosh" emblem such that when the shoe is placed within a heated environment and the imaging module 202 captures an image of the shoe using a thermal imaging device, the resulting thermal image will show the heated metal wire under the border of the "swoosh" emblem, which may be indicative of a genuine or authentic Nike® shoe.

Similarly, a baseball that is used in an MLB World Series® game may have a metal piece such as a wire inserted into the baseball during manufacturing, e.g., under the cover or layers of the interior core of the baseball placed in a predetermined pattern such as a shape of the MLB logo, a number, a name, a code, or other unique identifier, such that when the baseball is placed within a heated environment and the imaging module 202 captures an image of the baseball using a thermal imaging device, the resulting thermal image will show the heated metal wire within the baseball, which may be indicative of a genuine or authentic MLB World Series® baseball.

Other object or items may be manufactured with heat sensitive material that can be used to authenticate an origin of the object such as identification cards (e.g., placing metal wire around the outside of an identification badge and heating when the identification card is placed within a card reader); sports cards and other sports memorabilia; collectables such as paintings, antiques, shoes, pottery, and/or the like; original equipment manufacturer (OEM) parts such as computing parts, automotive parts, and/or the like; and/or the like.

In one embodiment, the authentication determination module 206 is configured to determine an authenticity of the object based on the at least one characteristic. For instance, the authentication determination module 206 may compare the thermal signature of the object to a second thermal signature of the object to determine the authenticity of the object, where the second thermal signature is a previously-determined thermal signature of the object.

For example, continuing with the Nike® shoe example above, the authentication determination module 206 may compare a current thermal image of the shoe that the imaging module 202 captures with a previously-captured thermal image of the shoe, e.g., an thermal image captured during and/or after the shoe is manufactured, to determine if the thermal signatures match (e.g., showing the metal wire outline of the "swoosh" emblem on the shoe), and if so, determine that the shoe is authentic or genuine. If the current thermal image of the shoe does not show the metal wire outline of the "swoosh" emblem and the previously-captured thermal image of the shoe does, then the authentication determination module 206 will determine that the shoe is not authentic or genuine.

Similarly, the authentication determination module 206 may determine that the ridge or bubble pattern shown in a thermal image of an object matches the ridge or bubble patterns that a particular equipment or tool generates and can determine that the object was manufactured using the equipment or tool that the manufacturer uses and is therefore an authentic or genuine object created by the manufacturer.

In one embodiment, the characteristic determination module 204 and/or the authentication determination module 206 associates the previously-determined thermal signature with the object in a way that uniquely identifies the object. For example, the thermal signature of the object, e.g., the thermal signature that is captured when the object is manufactured, may be associated with the object by storing the thermal signature and identifying information (e.g., a serial number) for the object in a secure database, by creating a blockchain entry that associates the thermal signature and the identifying information for the object, and/or the like.

In way of an example embodiment, the object may be a security card or badge that is used to uniquely identify and authenticate a user and provide access to secure areas. In such an embodiment, the security card or badge may include heat sensitive material around the border of the card, within the card itself, and/or the like. When the card is presented at a card reader, e.g., inserted into a card reader, the card reader may be configured to heat the card to a predetermined temperature such that the heat sensitive material emits a heat signature. The imaging module 202 may capture a thermal image of the card, the characteristic module 204 may determine identifying characteristics of the heated card (e.g., the heat or thermal signature of the heat sensitive material), and the authentication determination module 206 may compare the thermal signature to a previously-captured thermal signature of the card to determine whether the card is authentic or a counterfeit.

Figure 3A:
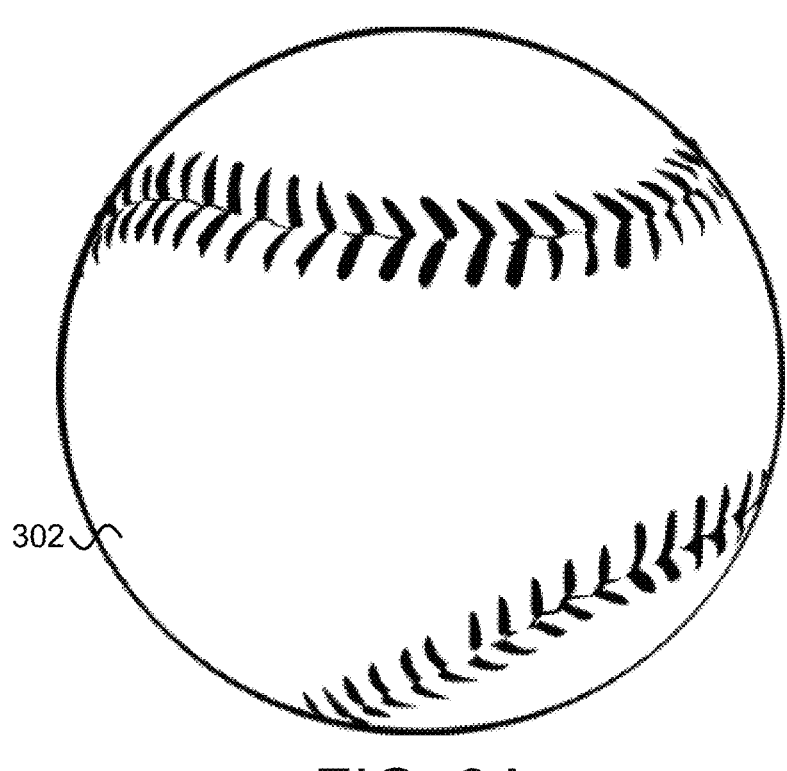
FIG. 3A is an example of an object that includes heat-sensitive material in accordance with the subject matter disclosed herein.
Figure 3B:
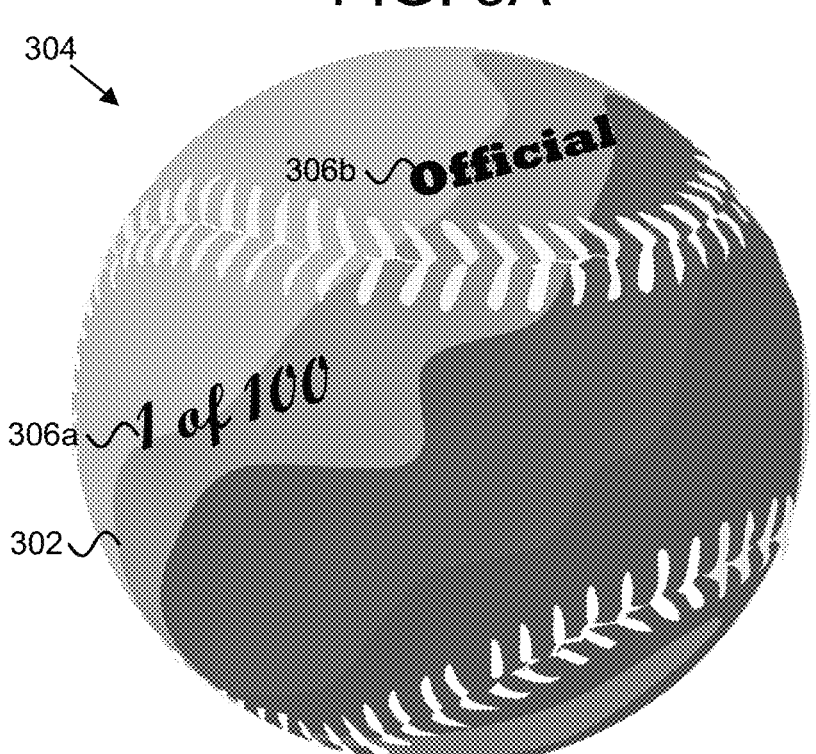
FIG. 3B is an example of a thermal image of the object shown in FIG. 3A depicting the heat-sensitive material in accordance with the subject matter disclosed herein.

FIGS. 3A and 3B depicts an example embodiment of the subject matter disclosed herein. In FIG. 3A, a baseball 302 is shown as captured using a regular imaging device. The baseball 302 may include heat sensitive material such as a metal wires embedded within the baseball 302, but that are not visible to the naked eye or using a regular imaging device.

However, as shown in FIG. 3B, when the imaging module 202 captures an image of the baseball 302 using a thermal imaging device within a heated environment, different areas of the baseball 302 are more visible than others according to the heat signature of the baseball 302. Furthermore, as shown herein, the heat sensitive material 306a, 306b may be visible within the thermal image. The heat sensitive material 306a, 306b may include metal wiring that is formed into different shapes, here lettering, which indicates the baseball is official or authentic. For example, the metal wiring may be formed to provide the series number of the baseball 306a and/or to specify that the baseball is "Official" 306b in a predetermined font or design. The characteristic determination module 204 may identify these characteristics and the authentication determination module 206 may determine whether the characteristics indicate an authenticity of the baseball 302. One of skill in the art will recognize other ways that the heat sensitive material may be configured to uniquely identify and authenticate an object.

Figure 4:
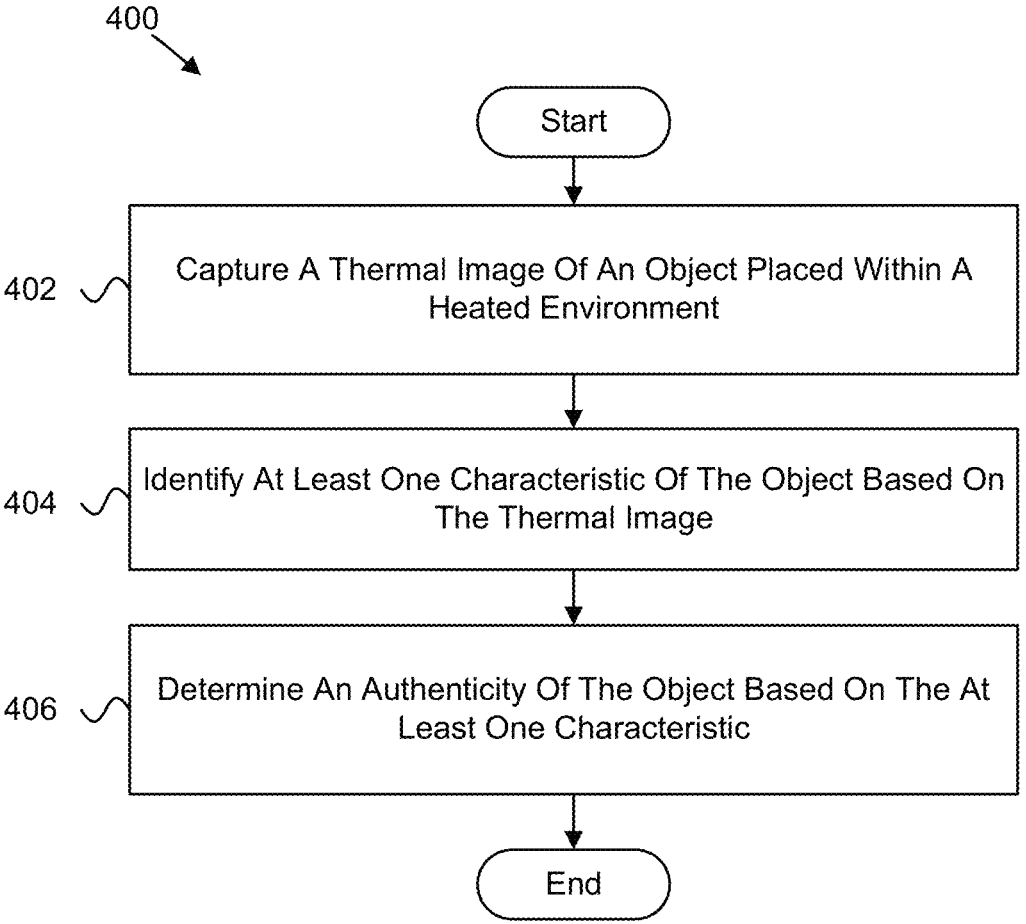
FIG. 4 is a schematic flow chart diagram illustrating one embodiment of another apparatus for heat-based authentication in accordance with the subject matter disclosed herein.

FIG. 4 depicts one embodiment of a method 400 for heat-based authentication. In one embodiment, the authentication apparatus 104, the imaging module 202, the characteristic determination module 204, and/or the authentication module 206 perform the various steps of the method 400.

In one embodiment, the method 400 begins and captures 402 a thermal image of an object placed within a heated environment, identifies 404 at least one characteristic of the object based on the thermal image, and determines 406 an authenticity of the object based on the at least one characteristic, and the method 400 ends.

Figure 5:
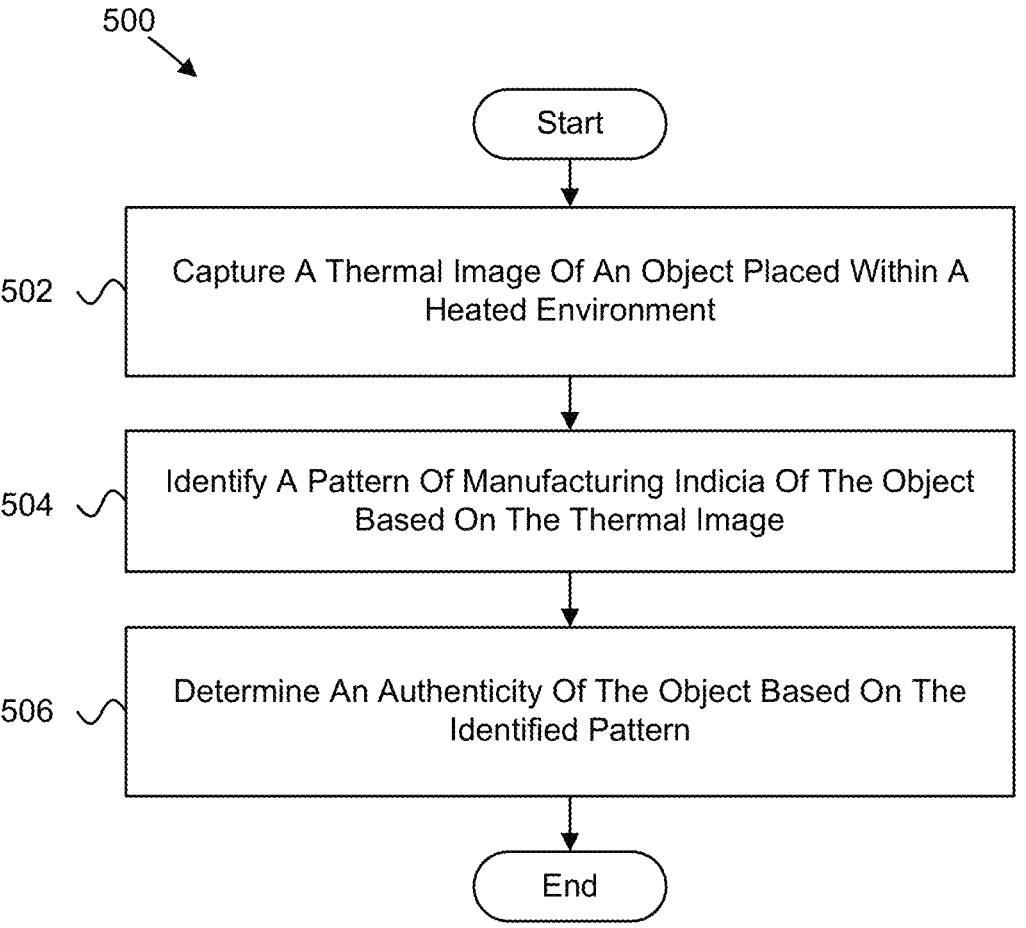
FIG. 5 is a schematic flow chart diagram illustrating one embodiment of a method for heat-based authentication in accordance with the subject matter disclosed herein.

FIG. 5 depicts one embodiment of a method 500 for heat-based authentication. In one embodiment, the authentication apparatus 104, the imaging module 202, the characteristic determination module 204, and/or the authentication module 206 perform the various steps of the method 500.

In one embodiment, the method 500 begins and captures 502 a thermal image of an object placed within a heated environment, identifies 504 a pattern of manufacturing indicia of the object based on the thermal image, and determines 506 an authenticity of the object based on the identified pattern, and the method 500 ends.

Figure 6:
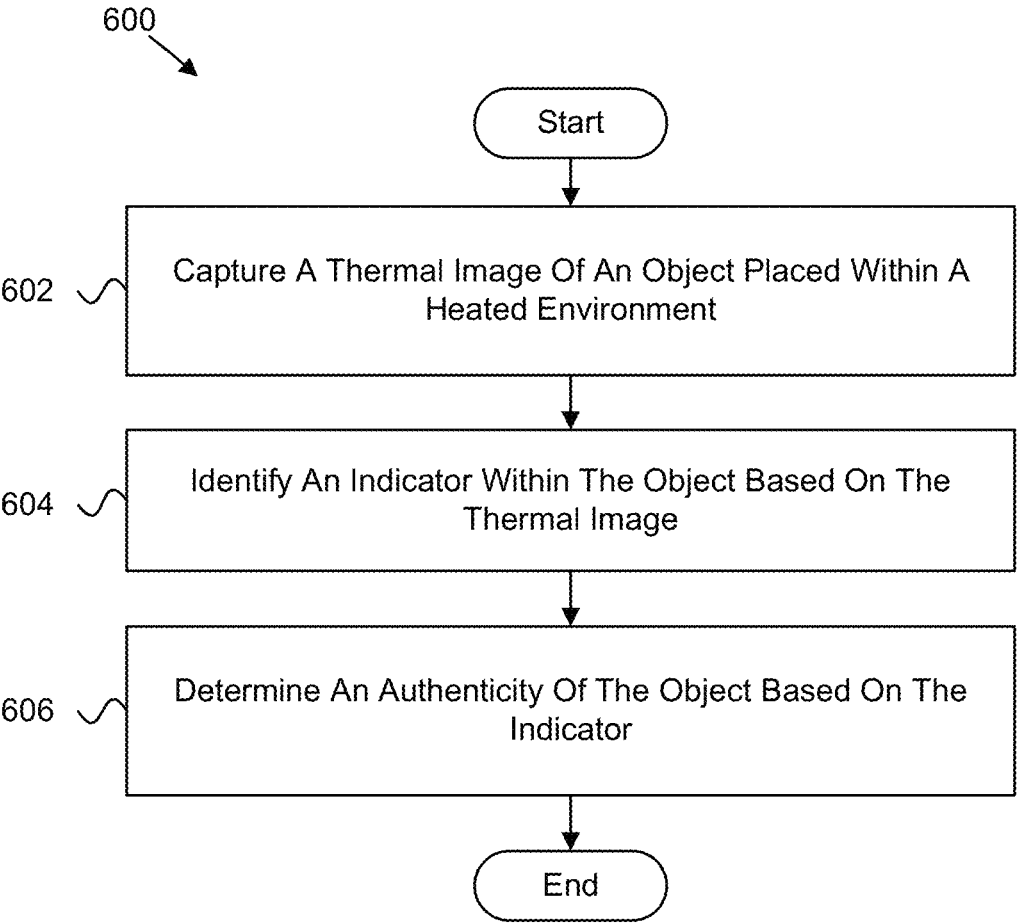
FIG. 6 is a schematic flow chart diagram illustrating one embodiment of another method for heat-based authentication in accordance with the subject matter disclosed herein.

FIG. 6 depicts one embodiment of a method 600 for heat-based authentication. In one embodiment, the authentication apparatus 104, the imaging module 202, the characteristic determination module 204, and/or the authentication module 206 perform the various steps of the method 600.

In one embodiment, the method 600 begins and captures 603 a thermal image of an object placed within a heated environment, identifies 604 an indicator within the object based on the thermal image, and determines 606 an authenticity of the object based on the indicator, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
    capture a thermal image of an object placed within a heated environment that is configured to uniformly heat the object;
    identify at least one characteristic of the object based on the thermal image, the at least one characteristic comprising a heat-responsive feature that is intentionally incorporated into the object and known prior to capturing the thermal image; and
    determine an authenticity of the object based on the at least one characteristic by comparing the thermal image to a reference thermal signature previously linked to the object in a secure data structure.

2. The apparatus of claim 1, wherein the code is executable by the processor to identify the at least one characteristic based on a thermal signature of the object.

3. The apparatus of claim 2, wherein the at least one characteristic comprises a pattern, a predefined indicator, or a combination of both within the thermal signature of the object.

4. The apparatus of claim 3, wherein the pattern comprises manufacturing indicia that are introduced to the object during manufacturing.

5. The apparatus of claim 4, wherein the manufacturing indicia comprises void patterns, ridge patterns, bubble patterns, or a combination thereof that are indicative of manufacturing equipment, a manufacturing location, or a combination thereof.

6. The apparatus of claim 3, wherein the predefined indicator comprises a heat sensitive material that is present within the object and is known prior to capturing the thermal image.

7. The apparatus of claim 6, wherein the heat sensitive material comprises a metal wire that is placed within the object in a predefined pattern.

8. The apparatus of claim 2, wherein the code is executable by the processor to compare the thermal signature of the object to a second thermal signature of the object to determine the authenticity of the object.

9. The apparatus of claim 8, wherein the second thermal signature comprises a previously-determined thermal signature of the object, the previously-determined thermal signature associated with the object in a way that uniquely identifies the object.

10. The apparatus of claim 9, wherein the previously-determined thermal signature is associated with the object using a secure database, a blockchain, or a combination thereof.

11. The apparatus of claim 1, wherein the object comprises a security card that includes heat sensitive material placed within the security card in a predefined pattern.

12. The apparatus of claim 1, wherein the object comprises a collectable item.

13. The apparatus of claim 1, wherein the apparatus further comprises an infrared camera for capturing the thermal image of the object.

14. A system, comprising:
a heated environment;
a thermal camera;
a processor;
a memory that stores code executable by the processor to:
    capture a thermal image of an object placed within the heated environment, the heated environment configured to uniformly heat the object;
    identify at least one characteristic of the object based on the thermal image, the at least one characteristic comprising a heat-responsive feature that is intentionally incorporated into the object and known prior to capturing the thermal image; and
    determine an authenticity of the object based on the at least one characteristic by comparing the thermal image to a reference thermal signature previously linked to the object in a secure data structure.

15. The system of claim 14, wherein the heated environment is configured to raise the temperature of the object to a temperature within a predefined temperature range.

16. The system of claim 14, wherein the thermal camera comprises an infrared camera.

17. The system of claim 14, wherein the code is executable by the processor to identify the at least one characteristic based on a thermal signature of the object.

18. The system of claim 17, wherein the at least one characteristic comprises a pattern, a predefined indicator, or a combination of both within the thermal signature of the object.

19. The system of claim 17, wherein the code is executable by the processor to compare the thermal signature of the object to a second thermal signature of the object to determine the authenticity of the object, the second thermal signature comprising a previously-determined thermal signature of the object that is captured using the heated environment.

20. A method comprising:
capturing, by a processor, a thermal image of an object placed within a heated environment that is configured to uniformly heat the object;
identifying at least one characteristic of the object based on the thermal image, the at least one characteristic comprising a heat-responsive feature that is intentionally incorporated into the object and known prior to capturing the thermal image; and
determining an authenticity of the object based on the at least one characteristic by comparing the thermal image to a reference thermal signature previously linked to the object in a secure data structure.

* * * * *